Figure 1:
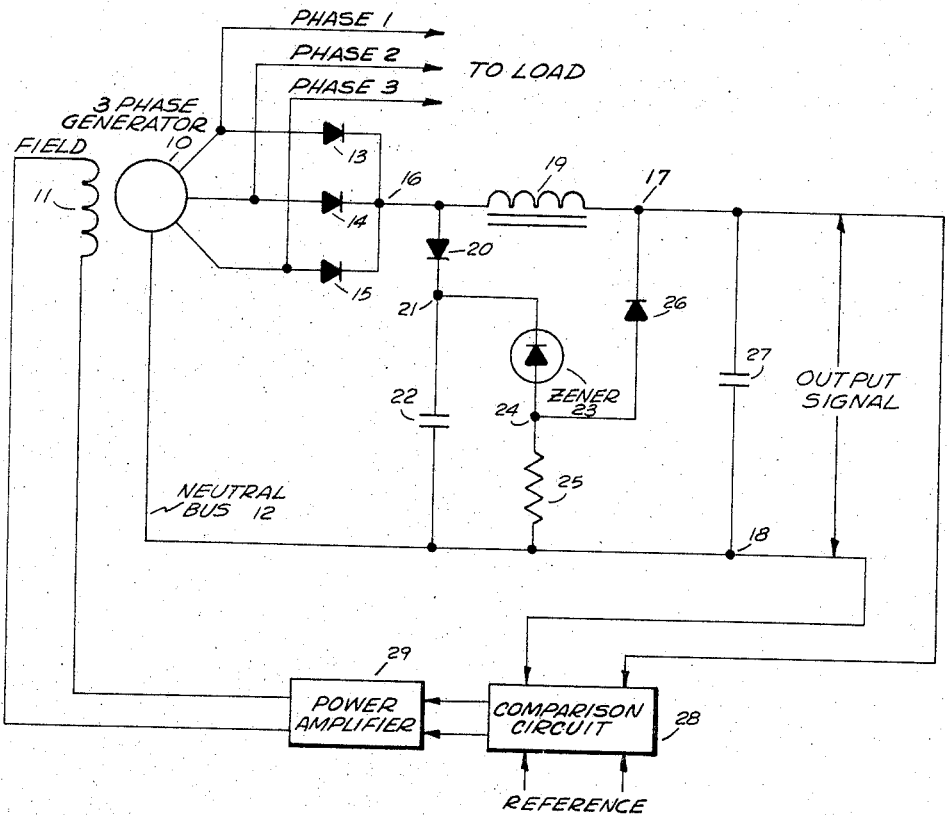

Sept. 5, 1967

J. M. FIELDS ET AL 3,340,459

AVERAGE VOLTAGE SENSING CIRCUIT HAVING
HIGHEST PHASE VOLTAGE TAKEOVER

Filed Feb. 28, 1963

INVENTOR.
JAMES M. FIELDS AND
SIDNEY T. KYZER
BY James J. Williams
ATTORNEY

United States Patent Office 3,340,459
Patented Sept. 5, 1967

3,340,459
AVERAGE VOLTAGE SENSING CIRCUIT HAVING HIGHEST PHASE VOLTAGE TAKEOVER
James M. Fields and Sidney T. Kyzer, Waynesboro, Va., assignors to General Electric Company, a corporation of New York
Filed Feb. 28, 1963, Ser. No. 261,665
6 Claims. (Cl. 322—28)

The invention relates to a voltage sensing circuit, and particularly to such a circuit for sensing the average of the phase voltages and the highest phase voltage in a multiphase power system.

In some multiphase power systems such as in aircraft, it is desirable that the voltages of all the individual phases relative to each other or relative to a neutral be maintained at their nominal value. In the event of a fault or short circuit on one or more of the phases or unbalanced loading of the generator, it is desirable that the other properly functioning phases be kept as near their normal condition as possible. In particular, it is desirable that the generator does not generate excessive voltages on the other phases. This condition might result if only the average of the phase voltages of the system were used to determine the condition of the voltages being supplied by the system.

Accordingly, an object of the invention is to provide an improved circuit for sensing the average voltage and the highest phase voltage produced by a multiphase source and producing a signal which is indicative of the higher of the sensed voltages and which can be used to control the voltage produced by the source.

Another object of the invention is to provide an improved voltage sensing circuit.

Another object of the invention is to provide a voltage sensing circuit that senses the average voltage and the highest phase voltage in a multiphase system and provides a signal indicative of the higher of the two sensed voltages.

Briefly, the invention comprises rectifier means which are coupled to the multiphase power system for producing a rectified voltage. Means are coupled between the output of the rectifier means and output terminals of the voltage sensing circuit for supplying a voltage which is proportional to the average of the phase voltages of the power system. Means are also coupled to the output of the rectifier means for producing a voltage which is proportional to the peak voltage of the power system. A portion of this peak voltage is derived by a voltage divider and coupled through a rectifier to the output terminals of the voltage sensing circuit. Under normal conditions, the voltage proportional to the average of the phase voltages is the greater voltage at the output terminals. If the average voltage falls below a predetermined magnitude, the derived portion of the peak voltage then exceeds the average voltage and produces the greater output signal. The greater output signal, whether based on the average voltage or the peak voltage, can be used to control the excitation power of the generator and maintain the proper voltage output until the cause of the reduced average voltage is corrected or cleared.

Figure 2:
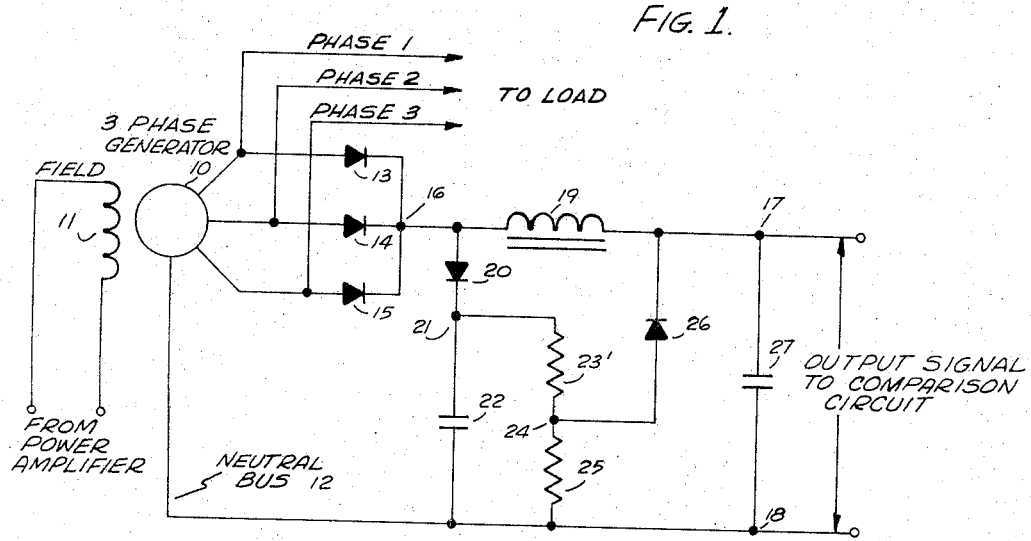

The invention is particularly pointed out in the claims. The invention may be better understood from the following description given in connection with the accompanying drawing, in which:

FIGURE 1 shows a schematic diagram of a preferred embodiment of the invention as used in a multiphase system with control circuitry; and FIGURE 2 shows a schematic diagram of another embodiment of the invention.

In FIGURE 1, the sensing circuit of the invention is shown as used with a three phase Y-connected system supplied by an alternating current generator 10. The generator 10 is operated by some suitable prime mover (not shown), and is excited by a field 11. The generator 10 has the three phase output terminals and a neutral bus 12 which are connected to a load in the usual Y-connected fashion. The sensing circuit includes a rectifier circuit coupled to the multiphase system. The rectifier circuit includes suitable rectifiers 13, 14, 15 whose anodes are respectively coupled to the three phases of the system. The cathodes of the rectifiers 13, 14, 15 are coupled together and coupled to a common rectifier circuit output terminal 16. Direct current output signals are derived from the voltage sensing circuit at first and second output terminals 17, 18. The first output terminal 17 is coupled through a choke coil or inductor 19 to the rectifier circuit terminal 16, and the second output terminal 18 is coupled to the neutral bus 12. A peak voltage circuit is coupled between the rectifier circuit terminal 16 and the neutral bus 12. This circuit includes a rectifier 20 which has its anode coupled to the rectifier circuit terminal 16 and its cathode coupled to a peak output terminal 21, and further includes a capacitor 22 coupled between the peak output terminal 21 and the neutral bus 12. The peak voltage circuit normally conducts current from the rectifier circuit terminal 16 toward the neutral bus 12. A voltage divider is coupled to the peak output terminal 21. The voltage divider includes a zener diode 23 which has its cathode coupled to the peak output terminal 21 and its anode coupled to a divider output terminal 24. A suitable current limiting impedance 25, such as a resistor, is coupled between the divider output terminal 24 and the neutral bus 12. As known in the art, when sufficient reverse voltage is applied to the zener diode 23, it permits reverse current to flow from its cathode to its anode. This reverse current produces a substantially constant voltage drop across the zener diode 23 for a range of reverse current magnitudes. Thus, the divider output terminal 24 is at a substantially fixed voltage below the voltage on the peak output terminal 21. The divider output terminal 24 is coupled to the first output terminal 17 by a rectifier 26 having its anode coupled to the divider output terminal 24 and its cathode coupled to the first output terminal 17. A filter capacitor 27 is coupled between the output terminals 17, 18. This capacitor 27 and the inductor 19 filter the rectified voltage at the rectifier circuit terminal 16 together serve as integrating means to provide an average voltage at the output terminal 17.

The voltage sensing circuit produces an output signal across the output terminals 17, 18. This signal, along with a reference signal, is coupled to a suitable comparison circuit 28. The comparison circuit 28 compares the two signals and produces an error signal indicative of their relative differences and applies this error signal to a power amplifier 29. The power amplifier 29 produces suitable direct current power in response to the error signal for exciting the generator field 11.

The various components of the voltage sensing circuit are designed so that when the loads on the three phases are substantially equal, and the voltages on the three phases relative to each other or relative to the neutral bus 12 are substantially equal (for example 115 volts), then the average voltage, produced by the filtering of the inductor 19 and the capacitor 27, at the output terminal 17 has some predetermined value (in the same example approximately 118 volts). With the voltage drop across the rectifier 20, which rectifier serves to isolate the peak sensing capacitor 22 from the averaging circuit, the peak voltage circuit produces a voltage proportional to the peak voltage at the peak output terminal 21 which is (in the same example approximately 150 volts) greater than the average voltage at the terminal 17. This voltage is reduced by the voltage divider so that the voltage at the divider output terminal 24 is slightly less than the average voltage at the output terminal 17. A suitable zener diode (for example one with a drop of 32 volts) is selected so that the voltage at the divider output terminal 24 is slightly less than the voltage at the output terminal 17. (In the example, the 32 volt drop of the zener diode 23 would provide slightly less than 118 volts at the divider output terminal 24.) The resistor 25 is chosen to properly limit the current through the voltage divider and the zener diode 23, with consideration being given to the added current through the zener diode 23 when the rectifier 26 conducts. (In the example, if this current were to be limited to 4 milliamperes, the resistor 25 would have a value of approximately 118 volts/4 ma. or 29,500 ohms.) Under normal conditions, the divider output terminal 24 is at a voltage (approximately 117 volts in the example) that is slightly lower than the average voltage (118 volts in the example) at the output terminal 17. The rectifier 26 does not conduct under these conditions. However, if a short circuit or fault develops between one of the phases and the neutral bus 12 or between two of the phases, or if a voltage unbalance occurs from an unbalanced loading of the generator, this condition will reduce the average voltage (in the example, normally 118 volts) at the output terminal 17. If this average voltage is reduced sufficiently (for example, to 116 volts or lower), the voltage (in the example 117 volts) at the divider output terminal 24 causes the rectifier 26 to conduct. This voltage thus appears at the output terminal 17 and maintains the voltage at the terminal 17 at a sufficiently high level so that the error signal produced by the comparison circuit 28 does not cause the power amplifier 29 to provide excessive field excitation and corresponding excessive generator voltages which may damage load equipment on the other phases. In this way, equipment on the other phases is kept operating under almost normal or lower than normal voltage conditions.

FIGURE 2 shows another embodiment of the sensing circuit in accordance with the invention but without the comparison circuit 28 and the power amplifier 29 shown in FIGURE 1. It is to be understood that these elements would be connected in the same manner however. The elements of the sensing circuit shown in FIGURE 2 have the same reference numerals as the corresponding elements of FIGURE 1. The only change has been that the zener diode 23 has been replaced by a resistor 23'. The design and operation of the circuit of FIGURE 2 are substantially the same as the design and operation of the circuit of FIGURE 1. The main difference is that the circuit of FIGURE 2 does not have as good regulation features as the circuit of FIGURE 1 because of the added voltage drop across the resistor 23' when the peak voltage circuit is effective in producing a signal at the output terminal 17. However, this regulation can be improved by adding a resistor in series with the inductor 19 between the points of connection to the rectifiers 20, 26.

It will be seen that the invention provides a new and improved voltage sensing circuit for use with multiphase power supply systems. The sensing circuit uses relatively inexpensive and lightweight components, and does not require transformers and the associated expense and weight. For this reason, the sensing circuit in accordance with the invention may be preferred in many applications, particularly those where weight is a consideration. While the invention has been described with reference to a three phase Y-connected system, it is to be understood that it may be used in other systems, such as a three phase delta-connected system or in a Y or delta system having any number of phases. Therefore, while the invention has been described with reference to particular embodiments, it is to be understood that modifications may be made without departing from the spirit of the invention or from the scope of the claims.

What we claim as new and desire to secure by Letters Patent of the United States is:

1. In a multiphase power system, a voltage sensing circuit comprising rectifier means coupled to said system for producing a rectified voltage, first and second output terminals for said sensing circuit, filter means coupled between said rectifier means and said output terminals for producing a voltage which is indicative of the average of the voltages of said power system, a first rectifier and a reactance device coupled in series between said rectifier means and said second output terminal for producing a voltage which is indicative of the highest of the voltages of said power system, first and second voltage dividing elements coupled in series between said second output terminal and the junction of said first rectifier and said reactance device, and a second rectifier coupled between said first output terminal and the junction of said voltage dividing elements.

2. In a system having a plurality of phases and a common bus for supplying power from a source to a load, a voltage sensing circuit comprising a rectifier circuit coupled to each phase of said system for producing a rectified voltage at an output terminal of said rectifier circuit, first and common output terminals for said sensing circuit, means coupling said common output terminal to said common bus, means coupled between said rectifier circuit output terminal and said first and common output terminals for producing a voltage having a magnitude that is proportional to an average of the voltages of the phases of said system, peak means coupled between said rectifier circuit output terminal and said common output terminal for producing a voltage having a magnitude that is proportional to the highest of the voltages of the phases of said system, a voltage reference device having one end coupled to said peak means, an impedance device coupled between the other end of said voltage reference device and said common output terminal, and a rectifier coupled between said other end of said voltage reference device and said first output terminal.

3. In a multiphase system having a plurality of phases and a common terminal for supplying power from a source to a load, a voltage sensing circuit comprising a rectifier circuit coupled to each phase of said system for producing a rectified voltage at an output terminal of said rectifier circuit, first and common output terminals for said sensing circuit, means coupling said common output terminal of said sensing circuit to said common terminal of said system, filter means coupled between said rectifier circuit output terminal and said first output terminal and between said first output terminal and said common output terminal for producing a voltage having a magnitude that is proportional to an average of the voltages of the phases of said system, a first rectifier having one end coupled to said rectifier circuit output terminal and poled to conduct current therefrom, a capacitor coupled between the other end of said first rectifier and said common output terminal, a voltage reference rectifier having one end coupled to said other end of said first rectifier and poled to normally block current flow therefrom, an impedance coupled between the other end of said voltage reference rectifier and said common output terminal, and a second rectifier coupled between said other end of said voltage reference rectifier and said first output terminal and poled to conduct current from said voltage reference rectifier.

4. In a multiphase system wherein power is supplied from a source to a load by a plurality of phases and a common bus, a voltage sensing circuit comprising a rectifier circuit coupled to each phase of said system for producing a rectified voltage at an output terminal of said rectifier circuit, first and common output terminals for said sensing circuit, means coupling said common output terminal to said system common bus, and inductive reactance coupled between said rectifier circuit output terminal and said first output terminal, a capacitive reactance coupled between said first and said common output terminals, a first rectifier having one end coupled to said rectifier circuit output terminal, a capacitive reactance coupled between the other end of said first rectifier and said common output terminal, said first rectifier being poled to conduct current from said rectifier circuit output terminal toward said common output terminal, a voltage reference diode having one end coupled to said other end of said first rectifier, an impedance device coupled between the other end of said voltage reference diode and said common output terminal, said voltage reference diode being poled to normally block direct current flow from said one end of said voltage reference rectifier toward said other end of said voltage reference rectifier until a predetermined voltage is developed across said voltage reference diode, and a second rectifier coupled between said other end of said voltage reference diode and said first output terminal, said second rectifier being poled to conduct current from said voltage reference diode toward said first terminal.

5. An average voltage generating circuit with peak voltage takeover comprising a rectifier, integrating means coupled to said rectifier to produce the average voltage of the output of said rectifier, a capacitor coupled to said rectifier to charge to the peak voltage of the output of said rectifier, isolation means coupling said capacitor to said rectifier to prevent said capacitor from discharging through said integrating means, voltage reducing means coupled to said capacitor to establish a voltage proportional to said peak voltage and having an amplitude slightly less than the normal amplitude of said average voltage, and means coupling the output of said voltage reducing means to the output of said integrating means whenever the average voltage falls below reduced peak voltage.

6. In a polyphase alternating current generator system, a circuit for regulating the generator output comprising a rectifier coupled to each phase of the generator output, integrating means coupled to said rectifier to produce the average of the rectified generator output voltage, a capacitor coupled to said rectifier to charge to the highest phase voltage of said generator output, isolation means coupling said capacitor to said rectifier to prevent said capacitor from discharging through said integrating means, voltage reducing means coupled to said capacitor to establish a voltage proportional to the highest phase voltage of said generator and having an amplitude slightly less than the amplitude of said average voltage during normal generator operation, means coupling the output of said voltage reducing means to the output of said integrating means whenever the average voltage falls below the reduced highest phase voltage, signal comparison means coupled to the output of said integrating means to compare the signal received therefrom with a reference voltage to derive an error signal, and means for applying said error signal to the field of said generator as a source of excitation.

References Cited

UNITED STATES PATENTS

| | | | |
|---|---|---|---|
| 2,940,033 | 6/1960 | McConnell | 322—28 |
| 3,155,847 | 11/1964 | Kirchmier | 307—88.5 |
| 3,211,988 | 10/1965 | Henderson | 322—28 |
| 3,237,023 | 2/1966 | Wilhelm | 324—103 X |

RUDOLPH V. ROLINEC, *Primary Examiner.*

WALTER L. CARLSON, *Examiner.*

J. J. MULROONEY, *Assistant Examiner.*